United States Patent
Do et al.

(10) Patent No.: US 8,457,394 B2
(45) Date of Patent: Jun. 4, 2013

(54) METHOD OF DETECTING SKIN-COLORED AREA USING VARIABLE SKIN COLOR MODEL

(75) Inventors: Jun-Hyeong Do, Daejeon (KR); Keun Ho Kim, Daejeon (KR); Jong Yeol Kim, Daejeon (KR)

(73) Assignee: Korea Institute of Oriental Medicine, Daejeon (KR)

( * ) Notice: Subject to any disclaimer, the term of this patent is extended or adjusted under 35 U.S.C. 154(b) by 233 days.

(21) Appl. No.: 13/058,903

(22) PCT Filed: Sep. 23, 2009

(86) PCT No.: PCT/KR2009/005422
§ 371 (c)(1),
(2), (4) Date: Feb. 14, 2011

(87) PCT Pub. No.: WO2010/041836
PCT Pub. Date: Apr. 15, 2010

(65) Prior Publication Data
US 2011/0142338 A1    Jun. 16, 2011

(30) Foreign Application Priority Data
Oct. 7, 2008  (KR) .................. 10-2008-0098058

(51) Int. Cl.
G06T 7/00     (2006.01)
(52) U.S. Cl.
USPC .................. 382/165; 382/118; 382/173

(58) Field of Classification Search
USPC .................. 382/162, 164, 165, 170–173
See application file for complete search history.

(56) References Cited

U.S. PATENT DOCUMENTS

| | | | |
|---|---|---|---|
| 7,302,096 B2 * | 11/2007 | Kim | 382/173 |
| 2004/0017930 A1 | 1/2004 | Kim et al. | |
| 2006/0088210 A1 | 4/2006 | Yu et al. | |
| 2007/0189627 A1 * | 8/2007 | Cohen et al. | 382/254 |
| 2008/0137957 A1 | 6/2008 | Xu et al. | |

FOREIGN PATENT DOCUMENTS

JP    2007-257087 A    10/2007

\* cited by examiner

*Primary Examiner* — Brian Q Le
*Assistant Examiner* — Michael Vanchy, Jr.
(74) *Attorney, Agent, or Firm* — Lucas & Mercanti, LLP

(57) ABSTRACT

The present invention relates to a method of detecting a skin-colored area using a variable skin color model. In the method, an initial skin-colored area is extracted from an input image using a skin color model, the initial skin-colored area being repeatedly extracted by adjusting a threshold value, which is a criterion for the selection of a skin-colored area, until a ratio of size of the extracted skin-colored area to size of the entire input image becomes less than a predetermined value. A skin-colored area is extracted by applying the threshold value determined in the first stage to the skin color model, the skin color model being modified by analyzing characteristics of object regions and noise regions of the skin-colored area. The skin-colored area detection method can obtain a high skin-colored object detection rate and a high false alarm rate even under various lighting and background conditions.

13 Claims, 17 Drawing Sheets

METHOD OF DETECTING SKIN-COLORED AREA USING VARIABLE SKIN COLOR MODEL

CROSS-REFERENCE TO RELATED APPLICATIONS

This application is a 371 of PCT/KR2009/005422 filed on Sep. 23, 2009, which claims the benefit of Korean Application No. 10-2008-0098058 filed on Oct. 7, 2008, the contents of each of which are incorporated herein by reference.

TECHNICAL FIELD

The present invention relates generally to a method of detecting a skin-colored area using a variable skin color model, and, more particularly, to a method of detecting a skin-colored area, which can realize high detection accuracy even under various lighting and background conditions.

BACKGROUND ART

Technology for automatically detecting a facial region from an image captured by a camera for the purpose of performing facial diagnosis, facial recognition, etc., and technology for automatically detecting a facial region for the purpose of implementing an automatic face tracking function have been developed. For these technologies, methods of detecting skin color have been widely used.

Generally, since the distribution of skin colors varies according to the person and also varies depending on lighting and environmental conditions, it is difficult to accurately extract skin-colored areas from respective input images.

When the range of color values regarded as skin color is wide, skin-colored areas can be extracted regardless of the features of input images. However, in this case, a false alarm or false acceptance causing an area other than a skin-colored area to be erroneously regarded as a skin-colored area may occur. In contrast, when the range of color values regarded as skin color is narrow, false rejection causing an actual skin-colored area to be erroneously regarded as a non-skin-colored area may occur.

Therefore, the modification of a model for extracting an accurate skin-colored area in line with the features of an input image is required.

Conventional technologies related to this modification are described below.

First, Korean Patent No. 2007-0016664 (registered on Feb. 8, 2007) discloses an apparatus and method for generating an RGB map for a skin color model and an apparatus and method for detecting skin color using the RGB map generation apparatus and method. This technology is directed to a scheme for extracting a skin-colored area at high speed using a single fixed skin color model. However, this scheme is disadvantageous in that the accuracy of skin color detection may be deteriorated depending on variation in lighting conditions or the features of an input image.

Korean Patent No. 2007-0008271 (registered on Jan. 17, 2007) discloses another conventional technology directed to a method of detecting and tracking a person in a frontal area in real time and a robot using this method. This technology is also disadvantageous in that, since a person is detected using a single skin color model, the accuracy of skin color detection may be deteriorated depending on lighting or background conditions or the features of an input image.

Korean Patent No. 2006-0012777 (registered on Feb. 9, 2006) discloses a further conventional technology directed to a method of detecting a face using skin color and pattern matching. This technology is configured to detect a skin-colored image using an initially-established skin color model which is established within the range of pixel values detected as pixels of skin color. In this case, when the range of pixel values, detected as skin-color pixels depending on the features of an input image, is narrow, it becomes sensitive to lighting, and thus a problem arises in that false rejection causing an actual skin-colored area to be erroneously regarded as a non-skin-colored area occurs. In contrast, when the range of pixel values is wide, another problem arises in that a false alarm or false acceptance causing a non-skin-colored area to be erroneously regarded as a skin-colored area occurs.

Korean Patent No. 2005-0050061 discloses yet another conventional technology directed to a method of extracting features from a face for inspection. This technology is directed to a scheme for converting an RGB image into a YCbCr image and regarding the YCbCr image as a skin-colored image when the Cb and Cr values of the YCbCr image fall within a specific range. This conventional technology is also configured to detect skin color using a fixed skin color model. In this case, since the fixed skin color model is used as in the above conventional technology, a problem arises in that the accuracy of skin color detection is deteriorated.

DISCLOSURE OF INVENTION

Technical Problem

Accordingly, the present invention has been made keeping in mind the above problems occurring in the prior art, and an object of the present invention is to provide a method of detecting a skin-colored area using a variable skin color model, which modifies a skin color model using feedback information in consideration of the features of input images, thus improving the accuracy of detection of skin color.

Solution to Problem

In order to accomplish the above object, the present invention provides a method of detecting a skin-colored area using a variable skin color model, comprising a first stage of extracting an initial skin-colored area from an input image using a skin color model, the initial skin-colored area being repeatedly extracted by adjusting a threshold value, which is required to regard a relevant area as a skin-colored area, until a ratio of a size of the extracted skin-colored area to a size of the entire input image becomes less than a predetermined value, and a second stage of extracting a skin-colored area by applying the threshold value for extraction of a skin-colored area, determined in the first stage to the skin color model, the skin color model being modified by analyzing characteristics of object regions and noise regions of the skin-colored area.

Preferably, the extraction of the skin-colored area in the first or second stage is performed by the following equation:

$$\text{skin}(x, y) = \begin{cases} 1 & \text{if } P(\text{skin} \mid \text{color}(x, y)) > \alpha \\ 0 & \text{otherwise} \end{cases}$$

where skin(x,y)

is a function indicating whether a color value of a given pixel (x,y), that is, color(x,y), is skin color (when skin(x,y) is 1, color(x,y) is regarded as skin color, whereas when skin(x,y) is 0, color(x,y) is regarded as non-skin color), p(skin|color(x,y)) is a skin color model indicating a probability that the color value of the pixel (x,y), that is, color(x,y), is skin color, and α is a threshold value for the extraction of the skin-colored area.

Preferably, the first stage comprises a first step of extracting the initial skin-colored area using an initially-established skin color model from the input image, a second step of calculating and analyzing the ratio of the size of the skin-colored area extracted at the first step to the size of the entire input image, a third step of determining whether a desired skin-colored area has been extracted by comparing the ratio of the size of the extracted skin-colored area to the size of the entire input image, which was calculated at the second step, with a preset reference value, and a fourth step of increasing the threshold value (α) for the extraction of the skin-colored area if it is determined that the ratio of the size of the extracted skin-colored area to the size of the entire input image is greater than the preset reference value, and thereafter repeating a procedure starting from the first step.

Preferably, the initial skin color model is created by collecting a plurality of images to construct a database, compiling statistics of color values which are used for skin color and color values which are not used for the skin color, and approximating a skin color probability model using a histogram or a Gaussian function.

Preferably, a color space used to construct the initial skin color model is one of RGB, YCbCr, YUV, HSV, HLS, CIE, CIE L*a*b, CIE L*u*v, and normalized RGB color spaces, and the initial skin color model is constructed using only color information of the selected color space, other than brightness information.

Preferably, the initial skin color model is constructed using only color information of the input image, other than brightness information.

Preferably, the second stage comprises a first step of extracting the skin-colored area by applying the threshold value for the extraction of the skin-colored area, determined in the first stage, to the skin color model, a second step of dividing the skin-colored area extracted at the first step into object regions and noise regions, and analyzing characteristics of the object regions and the noise regions, a third step of determining whether the number of object regions starts to be at a constant level, thus determining whether a desired skin-colored area has been extracted, a fourth step of modifying the skin color model and repeating a procedure starting from the first step if it is determined that the number of object regions is not at the constant level, and a fifth step of outputting results of the extraction of the skin-colored area if it is determined that the number of object regions is at the constant level.

Preferably, the second step comprises a first sub-step of dividing the extracted skin-colored area into the object regions and the noise regions in consideration of a size of the skin-colored area, and a second sub-step of analyzing characteristics of the object regions and the noise regions.

Preferably, the second sub-step is performed to detect and analyze a number and width of object regions, a number and width of noise regions, history of variation in the number and width of object regions and noise regions obtained by comparison with object regions and noise regions extracted when the skin color model before the repetition is performed was used, and a ratio of the extracted skin-colored area to the entire input image.

Preferably, at the third step, the determination is performed, based on the results of the analysis at the second step, depending on whether the number of object regions is at the constant level after having been rapidly reduced or whether the number of object regions is at the constant level after the repetition of the first to fourth steps has been performed a predetermined number of times.

Preferably, the fourth step is performed such that, when a skin color model in a k-th repetitive procedure is
$P_k(skin|color(x,y))$,
a probability that a color value having a high probability of being included in noise regions in a skin color model
$P_{k-1}(skin|color(x,y))$
in a k−1-th repetitive procedure is skin color is set to '0', and a probability that a color value having a high probability of being included in object regions is skin color is maintained at an identical value.

Advantageous Effects of Invention

The method of detecting a skin-colored area using a variable skin color model according to the present invention, which is constructed as described above, is configured to be directly fed back with the results of the detection of skin color and modify both a criterion for the selection of a skin-colored area and a skin color model, thus realizing a high detection rate for skin-colored objects and a low false alarm rate even under various lighting and background conditions.

BEST MODE FOR CARRYING OUT THE INVENTION

Figure 1:
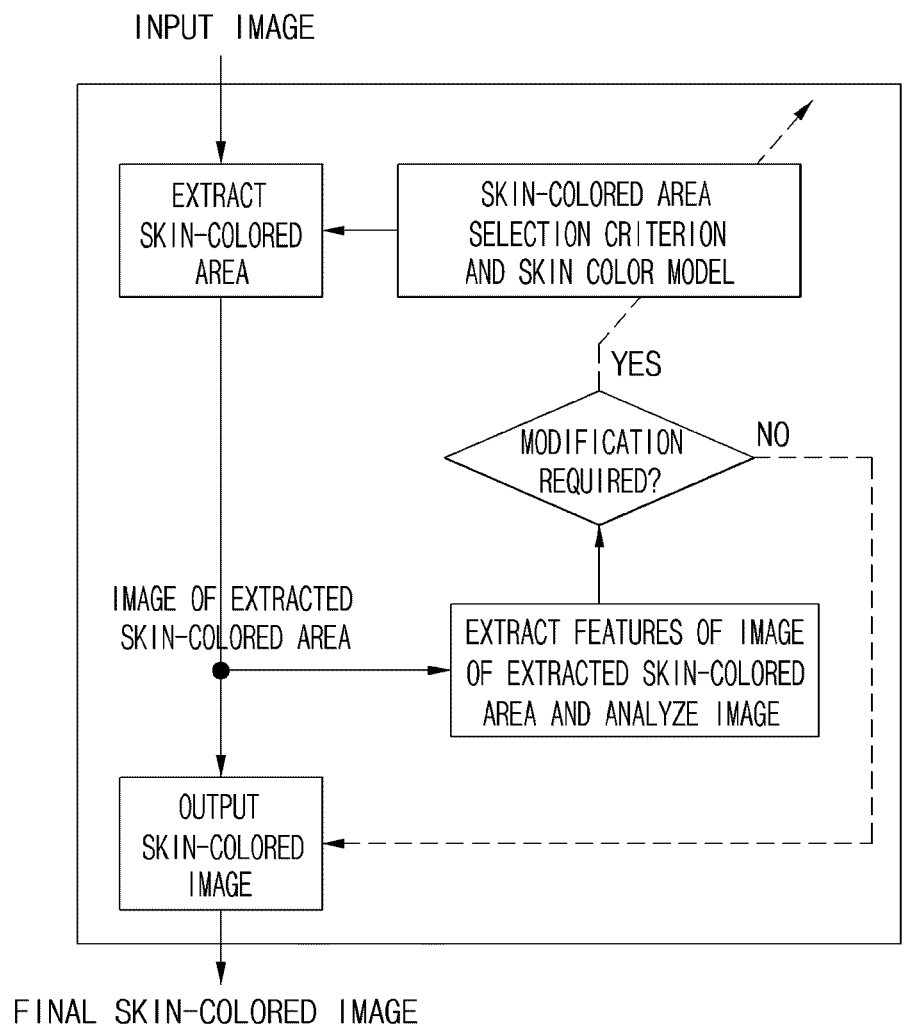
FIG. 1 is a flowchart schematically showing a concept of a method of detecting a skin-colored area using a variable skin color model according to the present invention.

Reference should now be made to the drawings, in which the same reference numerals are used throughout the different drawings to designate the same or similar components.

Detailed specifications and embodiments of the present invention will be described below with reference to the attached drawings.

A basic skin color model used in the present invention will be described first.

The basic skin color model is represented by
P(skin|color(x,y)),
where
P
is the probability of the color value of a given pixel
(x,y),
that is,
color(x,y),
being skin color. When the dichotomous determination of whether a color value is skin color or not, rather than the computation of a probability, is required,
P
has a value of '0' when a color value is not skin color, whereas
P
has a value of '1' when a color value is skin color.

When an input image is divided into a skin-colored area and the remaining area by applying the skin color model to the input image, Equation (1) is given as follows:

$$\text{skin}(x, y) = \begin{cases} 1 & \text{if } P(\text{skin} | \text{color}(x, y)) > \alpha \\ 0 & \text{otherwise} \end{cases} \quad (1)$$

where
skin(x,y)
indicates whether the color value of the pixel
(x,y),
that is,
color(x,y),
is skin color, and is a function indicating that a relevant area is a skin-colored area when
skin(x,y)
has a value of '1' at coordinates
(x,y)
whereas a relevant area is not a skin-colored area when
skin(x,y)
has a value of '0'.
Furthermore,
$\alpha$
is a threshold value required to select a skin-colored area using the skin color model, and is a constant between 0 and 1.

FIG. 1 is a flowchart schematically showing a concept of the method of detecting a skin-colored area using a variable skin color model according to the present invention.

The present invention is configured to establish an initial skin color model and extract a skin-colored area so as to minimize the occurrence of false rejection regardless of the occurrence of a false alarm.

Furthermore, the present invention is configured to be fed back with the results of the extraction of the skin-colored area, extract and analyze the features of an image of the extracted skin-colored area, and, when modification is required, modify both the criterion for the selection of the skin-colored area and the skin color model until only a desired skin-colored area is extracted.

In this case, the modification of the criterion for the selection of a skin-colored area means that the threshold value
$\alpha$
required to determine the skin-colored area is modified.

Figure 2:
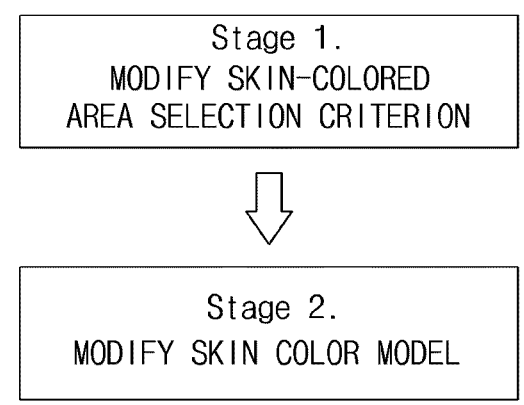
FIG. 2 is a flowchart showing the overall algorithm of the method of detecting a skin-colored area using a variable skin color model according to the present invention.
Figure 3:
FIG. 3 is a diagram showing an example in which the entire image is configured in color of a tone similar to that of skin color.

FIG. 2 is a flowchart showing the overall algorithm of the method of detecting a skin-colored area using a variable skin color model according to the present invention, and FIG. 3 is a diagram showing an example in which the entire image is configured in color of a tone similar to that of skin color.

Referring to FIG. 2, the method according to the present invention can be divided into two main stages.

The first stage is the stage of adjusting a condition required to regard a relevant area of the entire image as a skin-colored area on the basis of the ratio of the skin-colored area to the entire image, that is, the criterion for the selection of a skin-colored area, in preparation for the case where the entire image has the tone of skin color, as shown in FIG. 3.

That is, the first stage is configured to modify the value
$\alpha$
in Equation (1).

The second stage is the stage of modifying the skin color model in consideration of the characteristics of an object and noise in the output skin-colored image.

That is, the second stage is configured to modify
P(skin|color(x,y))
in Equation (1).

In this case, when an image in which most of the background has the tone of skin color is not dealt with, the first stage may be omitted.

MODE FOR THE INVENTION

Reference should now be made to the drawings, in which the same reference numerals are used throughout the different drawings to designate the same or similar components.

Detailed specifications and embodiments of the present invention will be described below with reference to the attached drawings.

A basic skin color model used in the present invention will be described first.

The basic skin color model is represented by
P(skin|color(x,y)),
where
P
is the probability of the color value of a given pixel
(x,y),
that is,
color(x,y),
being skin color. When the dichotomous determination of whether a color value is skin color or not, rather than the computation of a probability, is required,
P
has a value of '0' when a color value is not skin color, whereas
P
has a value of '1' when a color value is skin color.

When an input image is divided into a skin-colored area and the remaining area by applying the skin color model to the input image, Equation (1) is given as follows:

$$\text{skin}(x, y) = \begin{cases} 1 & \text{if } P(\text{skin} | \text{color}(x, y)) > \alpha \\ 0 & \text{otherwise} \end{cases} \quad (1)$$

where
skin(x,y)
indicates whether the color value of the pixel
(x,y),
that is,
color(x,y),
is skin color, and is a function indicating that a relevant area is a skin-colored area when
skin(x,y)
has a value of '1' at coordinates
(x,y)
whereas a relevant area is not a skin-colored area when
skin(x,y)
has a value of '0'.
Furthermore,
α
is a threshold value required to select a skin-colored area using the skin color model, and is a constant between 0 and 1.

FIG. 1 is a flowchart schematically showing a concept of the method of detecting a skin-colored area using a variable skin color model according to the present invention.

The present invention is configured to establish an initial skin color model and extract a skin-colored area so as to minimize the occurrence of false rejection regardless of the occurrence of a false alarm.

Furthermore, the present invention is configured to be fed back with the results of the extraction of the skin-colored area, extract and analyze the features of an image of the extracted skin-colored area, and, when modification is required, modify both the criterion for the selection of the skin-colored area and the skin color model until only a desired skin-colored area is extracted.

In this case, the modification of the criterion for the selection of a skin-colored area means that the threshold value
α
required to determine the skin-colored area is modified.

FIG. 2 is a flowchart showing the overall algorithm of the method of detecting a skin-colored area using a variable skin color model according to the present invention, and FIG. 3 is a diagram showing an example in which the entire image is configured in color of a tone similar to that of skin color.

Referring to FIG. 2, the method according to the present invention can be divided into two main stages.

The first stage is the stage of adjusting a condition required to regard a relevant area of the entire image as a skin-colored area on the basis of the ratio of the skin-colored area to the entire image, that is, the criterion for the selection of a skin-colored area, in preparation for the case where the entire image has the tone of skin color, as shown in FIG. 3.

That is, the first stage is configured to modify the value
α
in Equation (1).

The second stage is the stage of modifying the skin color model in consideration of the characteristics of an object and noise in the output skin-colored image.

That is, the second stage is configured to modify
P(skin|color(x,y))
in Equation (1).

In this case, when an image in which most of the background has the tone of skin color is not dealt with, the first stage may be omitted.

Figure 4:
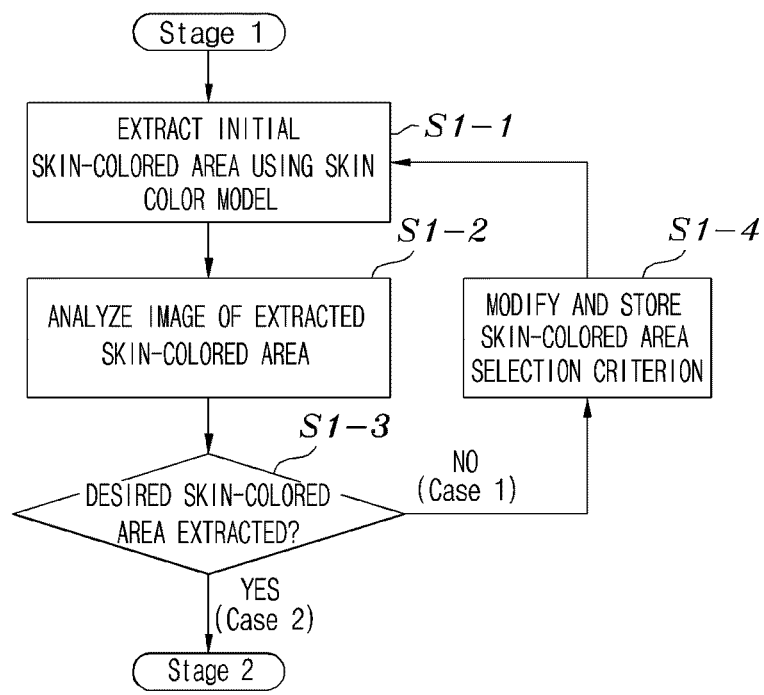
FIG. 4 is a flowchart showing the first stage of the method of detecting a skin-colored area using a variable skin color model according to the present invention.

FIG. 4 is a flowchart showing the first stage of the method of detecting a skin-colored area using a variable skin color model according to the present invention in detail.

Referring to FIG. 4, the first stage of the method of detecting a skin-colored area using a variable skin color model according to the present invention will be described below.

First, an initial skin-colored area is extracted from an input image using an initially-established skin color model at step S1-1.

That is, an initial skin color model
P(skin|color)
is established.

In the skin color model, the range of pixel values detected as skin color pixels is set to a wide range so that all possible skin-colored areas can be extracted.

That is, even if the occurrence of false alarm increases in the results of the extraction of the initial skin-colored area, the skin color model is established such that the occurrence of a false rejection is close to 0.

By way of example, the initial skin color model may be constructed by collecting existing pictures to construct a database (DB), compiling the statistics of color values used for skin color and the remaining color values, and approximating a skin color probability model using a histogram or a Gaussian function.

Examples of a color space that can be used to construct the skin color model may include RGB, YCbCr, YUV, HSV, HLS, CIE, CIE L*a*b, CIE L*u*v, normalized RGB color spaces, etc. In order to create a skin color model insensitive to variation in lighting, the skin color model is constructed using only color information other than brightness information (for example, Y values in YCbCr color space, Y values in YUV color space, L values in CIE L*a*b color space, etc.).

Next, the initial skin-colored area is extracted using the initial skin color model.

In this case, when the initial skin-colored area is extracted, the condition required to regard a relevant area as a skin-colored area is maximally loosened so that all possible skin-colored areas can be extracted, as in the case where the skin color model is established.

That is,
α
in Equation (1) is initially set to a small value as close to '0' as possible. For example, α
may be set to a value between 0 and 0.1.

After the initial skin-colored area has been extracted in this way using the initial skin color model, an image of the extracted skin-colored area is analyzed at step S1-2.

That is, the ratio of the size of the extracted skin-colored area to the size of the entire input image is calculated.

Next, whether a desired skin-colored area has been extracted is determined at step S1-3.

That is, this step is configured to determine whether to repeat a procedure for modifying a threshold value required to select a skin-colored area and re-extracting a skin-colored area (in the order of S1-4→S1-1→S1-2→S1-3) or whether to stop such a repetitive procedure, in consideration of the ratio of the size of the extracted skin-colored area to the size of the entire input image.

This step is described in detail. First, when the ratio is less than a predetermined reference value, the process proceeds to the second stage.

In contrast, when the ratio of the size of the extracted skin-colored area to the size of the entire input image is greater than the predetermined reference value, the repetitive procedure for re-extracting a skin-colored area is performed.

Here, the reference value may be set to a value which is the reference required to distinguish skin color of a person from skin color included in a background. That is, the skin color included in an excessively large area in the image is determined not to be skin color of a person, and a re-extraction step is performed.

When the process proceeds to the re-extraction step, the criterion for the selection of a skin-colored area is tightened at step S1-4. That is, $\alpha$ in Equation (1) is gradually increased. As the value $\alpha$ increases, the range of color regions identified as a skin-colored area decreases.

Figure 5:
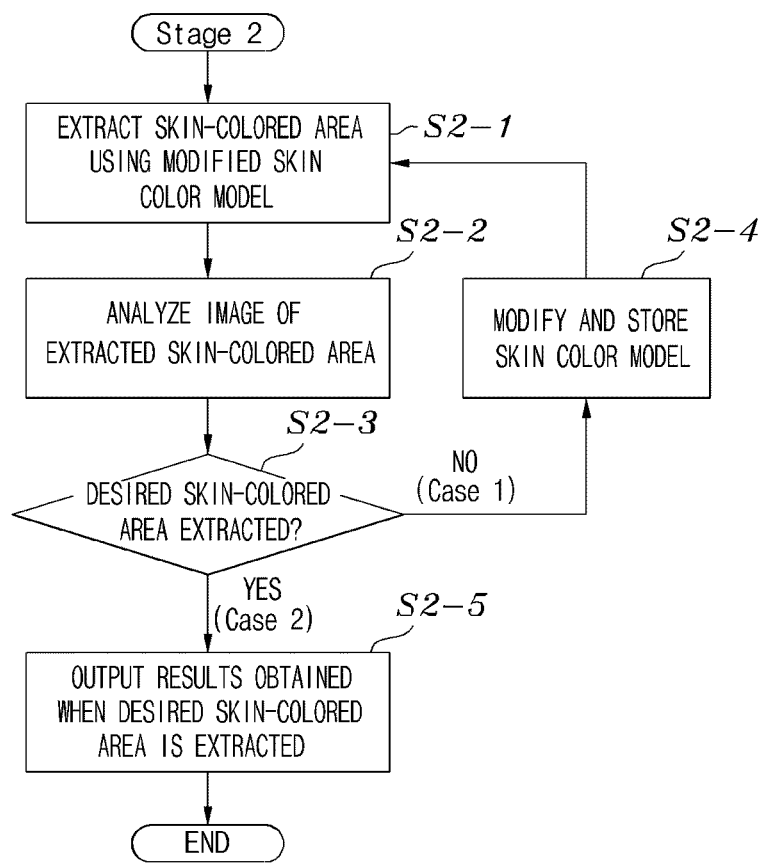
FIG. 5 is a flowchart showing the second stage of the method of detecting a skin-colored area using a variable skin color model according to the present invention.

FIG. 5 is a flowchart showing the second stage of the method of detecting a skin-colored area using a variable skin color model according to the present invention.

Referring to FIG. 5, the second stage of the method of detecting a skin-colored area using a variable skin color model according to the present invention will be described in detail.

The second stage of the method is the stage of modifying the initial skin color model, and is configured to use the final value of $\alpha$ obtained in the first stage and extract a skin-colored area by applying the skin color model to the input image at step S2-1.

Next, the extracted skin-colored area is analyzed at step S2-2.

This analysis step is described in detail. The extracted skin-colored area is divided into object regions and noise regions. In this case, the division into the object regions and the noise regions is performed in consideration of the size of the extracted skin-colored area. Generally, it can be seen that the size of a noise region is smaller than that of an object region.

Next, the characteristics of the object regions and the noise regions are analyzed. Examples of the characteristics of the respective regions may include the number and width of object regions, the number and width of noise regions, the history of variation in the number and width of regions obtained by the comparison with regions extracted when the previous skin color model was used, and the ratio of the extracted skin-colored area to the entire input image.

Whether a desired skin-colored area has been extracted is determined at step S2-3. If it is determined that a desired skin-colored area has not been extracted, the skin color model is modified and stored at step S2-4. Thereafter, the procedure for extracting a skin-colored area by applying the modified skin color model to the input image and then analyzing the skin-colored area is repeated until a desired skin-colored area is extracted (steps S2-1 to S2-3 are repeated).

When a desired skin-colored area has been extracted, the results of the extraction are output at step S2-5.

In this case, the step of determining whether the desired skin-colored area has been extracted is described in detail. First, whether to perform the procedure for modifying the skin color model and re-extracting a skin-colored area (in the order of S2-4→S2-1→S2-2→S2-3) or to stop that repetitive procedure is determined in consideration of the characteristics of the object regions and the noise regions and the number of modifications of the skin color model.

Examples of criteria required to determine whether a skin-colored area has been extracted are described below.

a. The time point at which the number of object regions starts to be at a constant level after having been rapidly reduced b. The time point at which the number of object regions starts to be at a constant level after a procedure including the 'skin color model modification step+skin-colored area re-extraction step' has been performed a predetermined number of times Whether a desired skin-colored area has been extracted is determined using these two conditions.

In this case, the time point at which the number of object regions starts to be at a constant level is detected by calculating a point at which a local minimum occurs first in the history of the number of object regions based on the number of repetitions of the modification of the skin color model.

A detailed procedure for modifying the skin color model if it is determined that the desired skin-colored area has not been extracted yet will be described below.

A skin color model $P_k(\text{skin}|\text{color})$ in a k-th repetitive procedure is modified as follows.

In a skin color model $P_{k-1}(\text{skin}|\text{color})$ in a k−1 repetitive procedure, a probability that a color value having a high probability of being included in noise regions (for example, color=$c_1$ is assumed) is skin color is set to '0'. That is, $P_k(\text{skin}|c_1)$ =0 is set.

Next, a probability that a color value having a high probability of being included in object regions (for example, color=$c_2$ is assumed) is skin color is maintained at the original probability value. That is, $P_k(\text{skin}|c_2) = P_{k-1}(\text{skin}|c_2)$ is set.

This relationship is represented by the following Equation (2):

$$P_k(\text{skin} | \text{color}(x, y)) = \begin{cases} P_{k-1}(\text{skin} | \text{color}(x, y)) & \text{if } P_{k-1}(\text{object} | (\text{skin} | \text{color}(x, y)) > \theta \\ 0 & \text{otherwise} \end{cases} \quad (2)$$

In the k−1-th repetitive procedure, a probability $P(\text{object}|(\text{skin}|\text{color}))$ that the color value of a given pixel (x,y), that is, color(x,y), is skin color and is included in the object regions is calculated by the following Equation (3) based on Bayes' Theorem:

$$P(\text{object} | (\text{skin} | \text{color}(x, y)) = \frac{P((\text{skin}|\text{color})|\text{object})P(\text{object})}{P((\text{skin}|\text{color})|\text{object})P(\text{object}) + P((\text{skin}|\text{color})|\text{noise})P(\text{noise})} \quad (3)$$

$$= \frac{\dfrac{os[\text{color}]}{T_{os}} \cdot \dfrac{T_{os}}{T_{os}+T_{ns}}}{\dfrac{os[\text{color}]}{T_{os}} \cdot \dfrac{T_{os}}{T_{os}+T_{ns}} + \dfrac{ns[\text{color}]}{T_{ns}} \cdot \dfrac{T_{ns}}{T_{os}+T_{ns}}}$$

-continued $$= \frac{os[color]}{os[color] + ns[color]}$$

where os[color],
is the number of pixels having a color value color,
in the object regions among regions extracted as a skin-colored area, ns[color],
is the number of pixels having a color value color,
in the noise regions among regions extracted as the skin-colored area, $T_{os}$
is the number of all pixels in the object regions among regions extracted as the skin-colored area, and $T_{ns}$
is the number of all pixels in the noise regions among regions extracted as the skin-colored area.

FIGS. 6 to 9, 10 to 13 and 14 to 17 are diagrams showing the comparison between the results of the extraction of a skin-colored area when the conventional technology is applied to an input image and the results of the extraction of a skin-colored area when the present invention is applied to the input image.

Figure 6:
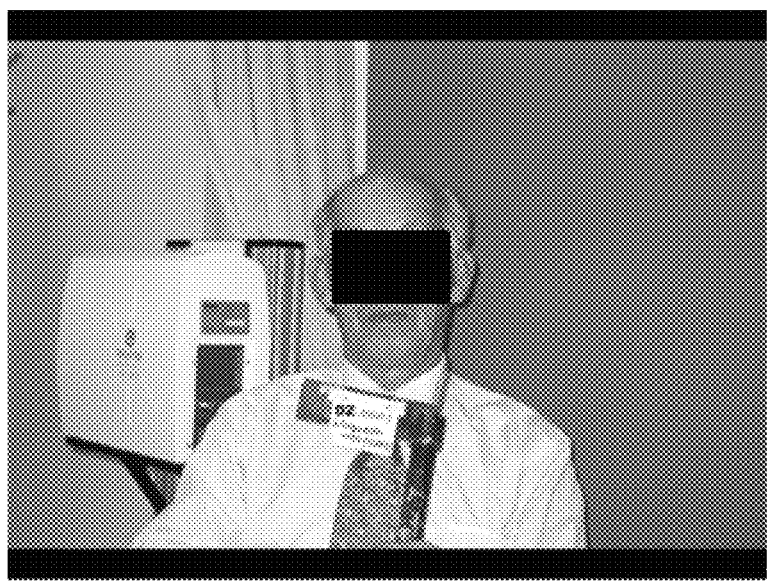
FIGS. 6 to 17 are diagrams showing the comparison between the results of the extraction of a skin-colored area obtained when conventional technology is applied to an input image and the results of the extraction of a skin-colored area obtained when the present invention is applied to the input image.
Figure 7:
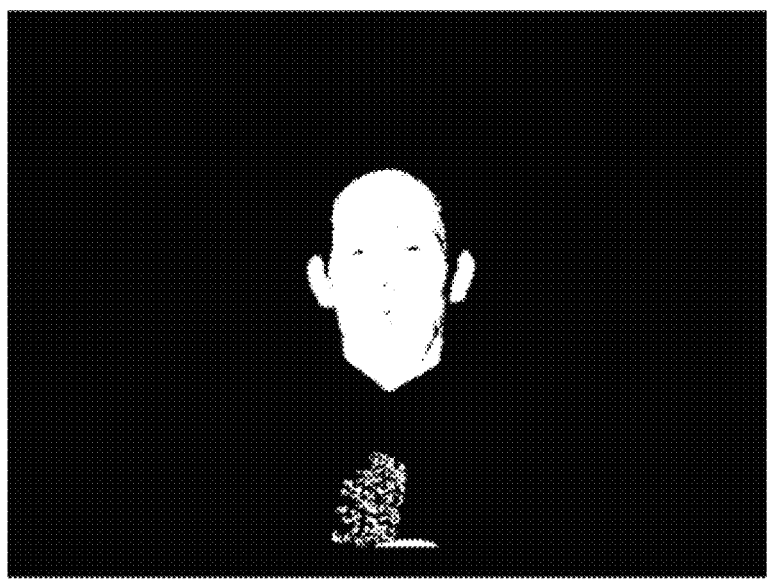
Figure 8:
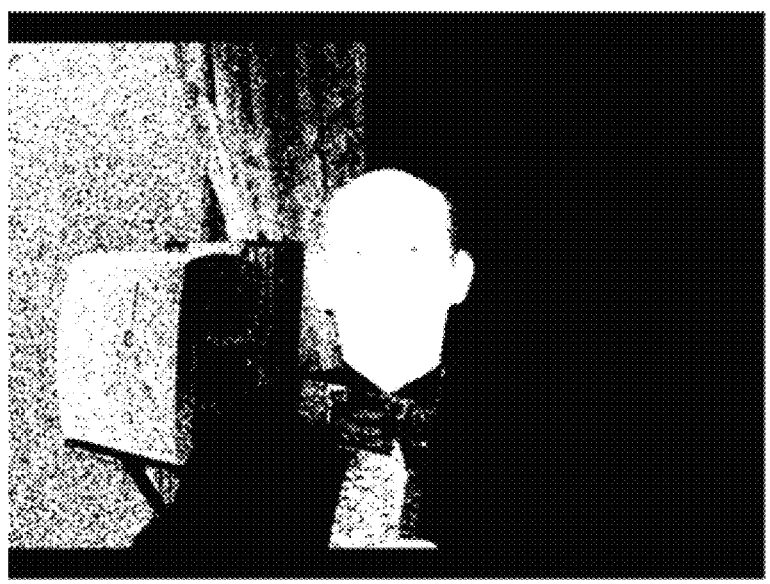
Figure 9:
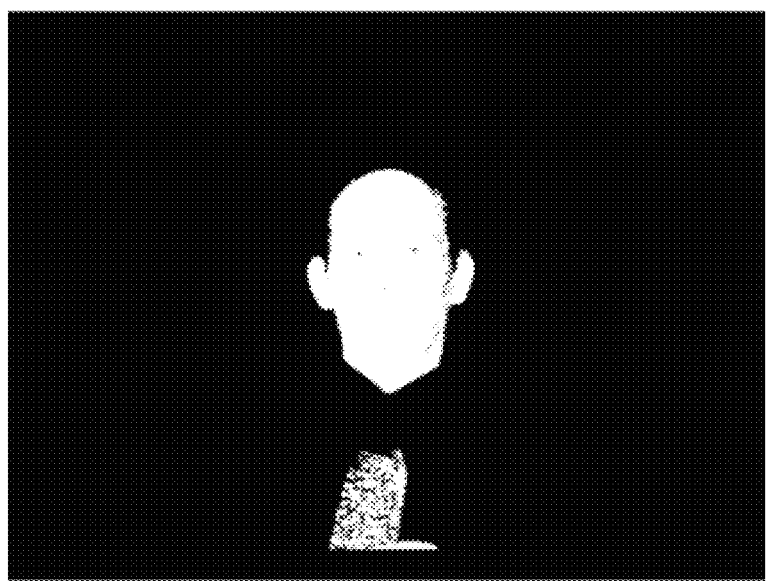
Figure 10:
Figure 11:
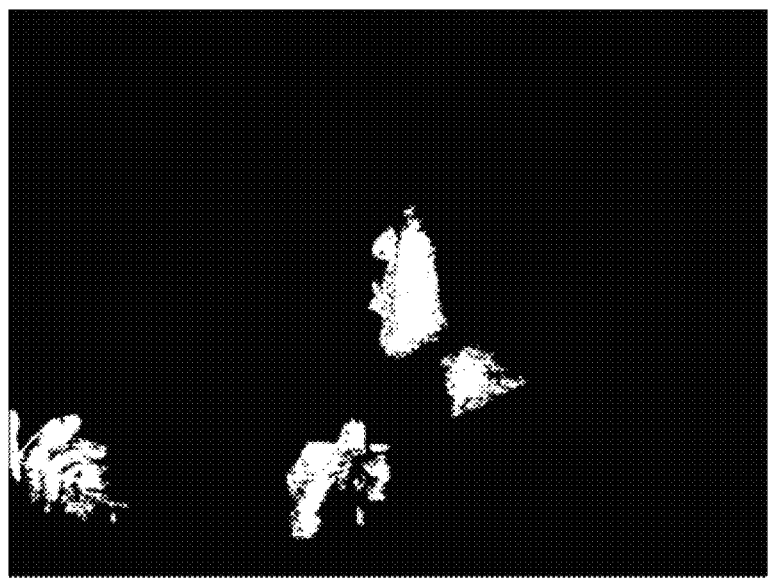
Figure 12:
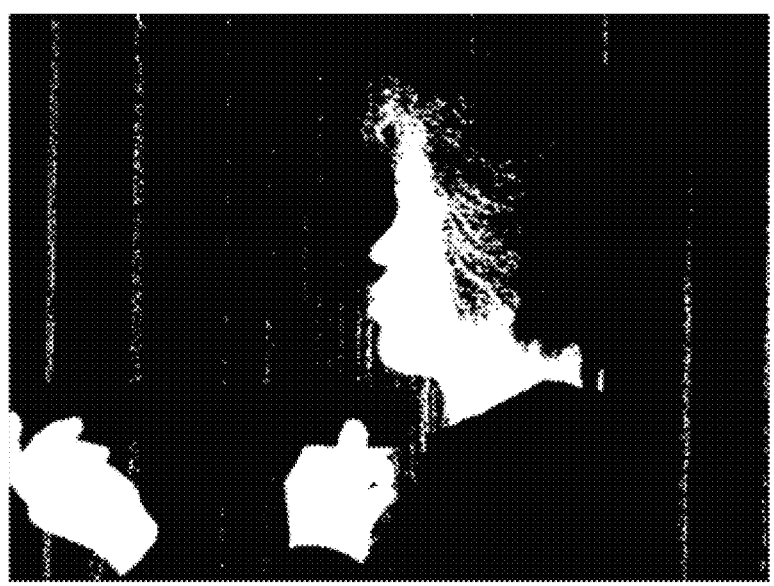
Figure 13:
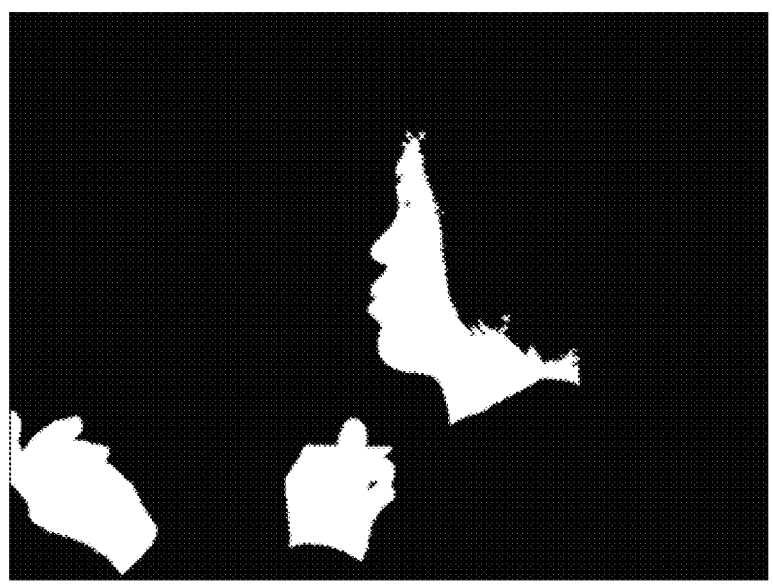
Figure 14:
Figure 15:
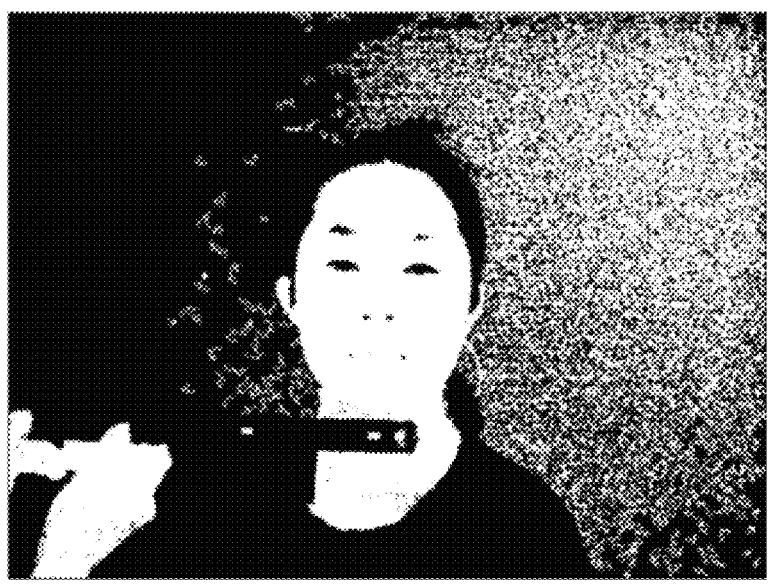
Figure 16:
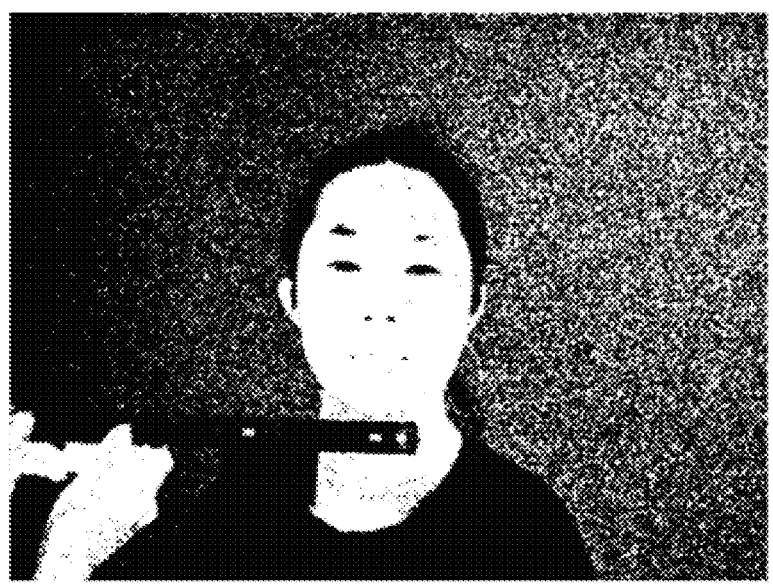
Figure 17:
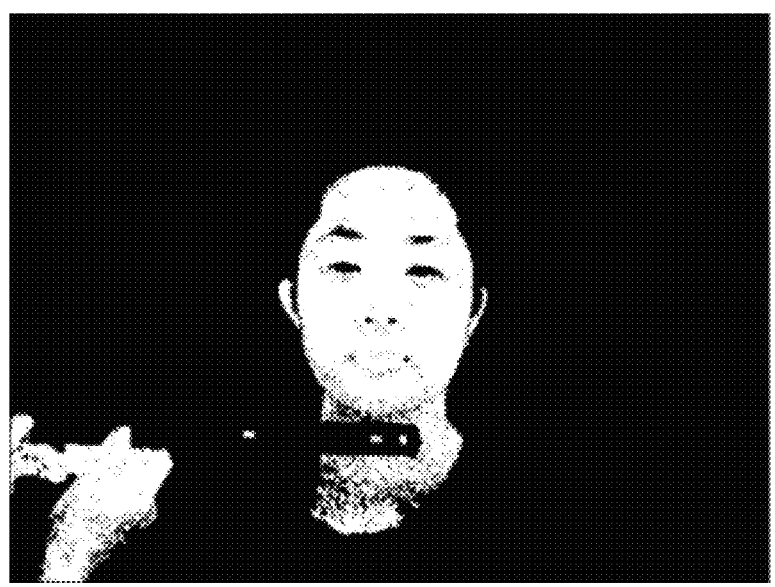

FIGS. 6, 10 and 14 are diagrams showing input images, FIGS. 7, 11 and 15 are diagrams showing the results of the extraction of a skin-colored area obtained when a single fixed criterion for the selection of a skin-color area is used, FIGS. 8, 12 and 16 are diagrams showing the results obtained by performing the first stage according to the present invention, and FIGS. 9, 13 and 17 are diagrams showing the final results of the extraction of a skin-colored area according to the present invention.

In FIG. 6, half of a background region, as well as an object (personal) region, has color of a tone similar to that of skin color.

In the conventional technology, that is, in the case where a fixed criterion for the selection of a skin-colored area and a fixed skin color model are used, only the pure skin-colored area of a person is desirably extracted in the case of FIG. 7.

When the skin-colored area detection method of the present invention is used, a skin-colored area is extracted by adjusting a threshold value, which is the criterion for the selection of a skin-colored area from a skin color model, until a desired image is obtained, as shown in FIG. 8, and then the skin color model is modified to eliminate the remaining noise regions. Accordingly, as shown in FIG. 9, a more accurate skin-colored area can be extracted.

In contrast, as shown in FIG. 10, a skin-colored area coexists in an object (personal) region and part of a background region. In this case, when the fixed skin color model of FIG. 7 is used, even a personal region is not desirably detected, as shown in FIG. 11 (high false acceptance rate).

However, when the skin-colored area detection method of the present invention is used, some skin-colored areas of the background region are detected as part of the skin-colored area, which is noise, by the detection in the first stage, as shown in FIG. 11. However, since the skin color model is modified to exclude the color of noise regions included in the skin-colored area detected in the second stage from the skin-colored area, the pure skin color of a person can be extracted, as shown in FIG. 13.

In FIG. 14, the tone of the color of the background is similar to that of the skin color of a person. When the fixed skin color model of FIG. 7 is used, a region of the skin color tone included in the background is also extracted as a skin-colored area, as shown in FIG. 15 (high false alarm rate), and thus only the skin-colored area of the person cannot be accurately extracted. However, when the skin-colored area detection method according to the present invention is used, only the skin-colored area of the person can be accurately extracted, as shown in FIG. 17, via the results of the detection of the first stage of FIG. 16.

As described above, although the preferred embodiments of a method of detecting a skin-colored area using a variable skin color model according to the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, a method of detecting a skin-colored area using a variable skin color model according to the present invention, which is constructed as described above, is configured to be directly fed back with the results of the detection of skin color and modify both a criterion for the selection of a skin-colored area and a skin color model, thus realizing a high detection rate for skin-colored objects and a low false alarm rate even under various lighting and background conditions.

The invention claimed is:
1. A method of detecting a skin-colored area using a variable skin color model, comprising:
a first stage of extracting an initial skin-colored area from an input image using a skin color model, wherein the initial skin-colored area being repeatedly extracted by adjusting a threshold value, which is a criterion for selection of a skin-colored area, until a ratio of a size of the extracted initial skin-colored area to a size of the entire input image becomes less than a predetermined value; and
a second stage of extracting a skin-colored area by applying the threshold value determined in the first stage to the skin color model, the skin color model being modified by analyzing characteristics of object regions and noise regions of the skin-colored area;
wherein the second stage comprises:
a first step of extracting the skin-colored area by applying the threshold value, determined in the first stage, to the skin color model;
a second step of dividing the skin-colored area extracted at the first step into object regions and noise regions, and analyzing characteristics of the object regions and the noise regions;
a third step of determining whether the number of object regions starts to be at a constant level, thus determining whether a desired skin-colored area has been extracted;
a fourth step of modifying the skin color model and repeating a procedure starting from the first step if it is determined that the number of object regions is not at the constant level; and
a fifth step of outputting results of the extraction of the skin-colored area if it is determined that the number of object regions is at the constant level, wherein at the fourth step, the skin color model is modified based on a color value of a pixel included in the object regions and a color value of a pixel included in the noise regions.

2. The method according to claim 1, wherein the extraction in the first or second stage is performed by the following equation:

$$\text{skin}(x, y) = \begin{cases} 1 & \text{if } P(\text{skin} \mid \text{color}(x, y)) > \alpha \\ 0 & \text{otherwise} \end{cases}$$

wherein
skin(x,y) is a function indicating whether a color value of a given pixel (x,y);
color (x,y), is skin color;
P(skin|color(x,y), is a skin color model indicating a probability that the color value of the pixel (x,y); and
α is a threshold value which is the criterion for the selection of the skin-colored area.

3. The method according to claim 2, wherein the first stage comprises:
a first step of extracting the initial skin-colored area using an initially-established skin color model from the input image;
a second step of calculating and analyzing the ratio of the size of the skin-colored area extracted at the first step to the size of the entire input image;
a third step of determining whether a desired skin-colored area has been extracted by comparing the ratio of the size of the extracted skin-colored area to the size of the entire input image, which was calculated at the second step, with a preset reference value; and
a fourth step of increasing the threshold value (α) which is the criterion for the selection of the skin-colored area if it is determined that the ratio of the size of the extracted skin-colored area to the size of the entire input image is greater than the preset reference value, and thereafter repeating a procedure starting from the first step.

4. The method according to claim 3, wherein the first step comprises:
a first sub-step of establishing the initial skin color model; and
a second sub-step of extracting the initial skin-colored area using both the initial skin color model and the threshold value (α) having a value between 0 and 0.1.

5. The method according to claim 4, wherein the initial skin color model is created by collecting a plurality of images to construct a database, compiling statistics of color values which are used for skin color and color values which are not used for the skin color, and approximating a skin color probability model using a histogram or a Gaussian function.

6. The method according to claim 4, wherein a color space used to construct the initial skin color model is one of RGB, YCbCr, YUV, HSV, HLS, CIE, CIE L*a*b, CIE L*u*v, and normalized RGB color spaces.

7. The method according to claim 4, wherein the initial skin color model is constructed using only color information of the input image, other than brightness information.

8. The method according to claim 1, wherein the second step comprises:
a first sub-step of dividing the extracted skin-colored area into the object regions and the noise regions in consideration of a size of the skin-colored area; and
a second sub-step of analyzing characteristics of the object regions and the noise regions.

9. The method according to claim 8, wherein the second sub-step is performed to detect and analyze the number and width of object regions, the number and width of noise regions, history of variation in the number and width of object regions and noise regions obtained by comparison with object regions and noise regions extracted when the skin color model before the repetition is performed was used, and a ratio of the extracted skin-colored area to the entire input image.

10. The method according to claim 1, wherein at the third step, the determination is performed, based on the results of the analysis at the second step, depending on whether the number of object regions is at the constant level after having been rapidly reduced or whether the number of object regions is at the constant level after the repetition of the first to fourth steps has been performed a predetermined number of times.

11. The method according to claim 10, wherein at the third step, a time point at which the number of object regions is at the constant level is set to a point at which a first local minimum occurs in the history of the variation in the number of object regions.

12. The method according to claim 1, wherein the fourth step is performed such that, when a skin color model in a k-th repetitive procedure is $P_k(\text{skin}|\text{color})$, a probability that a color value having a high probability of being included in noise regions in a skin color model $P_{k-1}(\text{skin}|\text{color})$ in a k-1-th repetitive procedure is skin color is set to '0', and a probability that a color value having a high probability of being included in object regions is skin color is maintained at an identical value.

13. The method according to claim 1, wherein at the fourth step, the modification of the skin color model is performed by the following equation when a skin color model in a k-th repetitive procedure is $P_k(\text{skin} \mid \text{color})$:

$P_k(\text{skin} \mid \text{color}(x, y)) =$ $$\begin{cases} P_{k-1}(\text{skin} \mid \text{color}(x, y)) & \text{if } P_{k-1}(\text{object} \mid (\text{skin} \mid \text{color}(x, y)) > \theta \\ 0 & \text{otherwise} \end{cases}$$

$$P(\text{object} \mid (\text{skin} \mid \text{color}(x, y)) = \frac{P((\text{skin} \mid \text{color}) \mid \text{object})P(\text{object})}{P((\text{skin} \mid \text{color}) \mid \text{object})P(\text{object}) + P((\text{skin} \mid \text{color}) \mid \text{noise})P(\text{noise})}$$

$$= \frac{\frac{os[\text{color}]}{T_{os}} \cdot \frac{T_{os}}{T_{os} + T_{ns}}}{\frac{os[\text{color}]}{T_{os}} \cdot \frac{T_{os}}{T_{os} + T_{ns}} + \frac{ns[\text{color}]}{T_{ns}} \cdot \frac{T_{ns}}{T_{os} + T_{ns}}}$$

$$= \frac{os[\text{color}]}{os[\text{color}] + ns[\text{color}]}$$

wherein
P(object|(skin|color)) is a probability that a color value of a given pixel (x,y);
color (x,y) is included in object regions when the color is the skin color;
k is the number of repetitions;
os[color] is the number of pixels having a color value, color, in the object regions among regions extracted as the skin-colored areas;
ns[color] is the number of pixels having a color value, color, in the noise regions among regions extracted as the skin-colored areas;

$T_{os}$ is the number of all pixels included in the object regions among the regions extracted as the skin-colored area; and $T_{ns}$ is the number of all pixels included in the noise regions among the regions extracted as the skin-colored area.

* * * * *